United States Patent [19]

Simpkin

[11] Patent Number: 4,793,952
[45] Date of Patent: Dec. 27, 1988

[54] INTERFACE CONTROL APPARATUS

[75] Inventor: John Simpkin, Leigh, England

[73] Assignee: British Nuclear Fuels plc, Risley, England

[21] Appl. No.: 6,914

[22] Filed: Jan. 27, 1987

[30] Foreign Application Priority Data

Feb. 14, 1986 [GB] United Kingdom ............... 8603673

[51] Int. Cl.$^4$ ............................................. B01D 21/34
[52] U.S. Cl. .................................. 261/61; 261/121.1;
    137/386; 137/253; 210/97; 210/137; 141/198
[58] Field of Search ............... 210/86, 97, 104, 137;
    137/386, 412, 403, 413, 253; 73/319–322, 309;
    141/95, 198; 422/111, 112; 261/61, 121.1

[56] References Cited

U.S. PATENT DOCUMENTS

| 425,667 | 4/1890 | Fenby | 137/253 |
| 2,616,440 | 11/1952 | Mason | 137/424 |
| 3,104,678 | 9/1963 | Cole | 137/403 |
| 3,200,971 | 8/1965 | Trethewey | 137/403 |
| 3,470,902 | 10/1969 | Hackman | 137/386 |
| 3,601,146 | 5/1969 | Reighard et al. | 137/413 |
| 4,660,586 | 4/1987 | Knapp et al. | 137/386 |

FOREIGN PATENT DOCUMENTS 565726 11/1944 United Kingdom .
889797 2/1962 United Kingdom .

Primary Examiner—Richard V. Fisher
Assistant Examiner—Coreen Y. Lee
Attorney, Agent, or Firm—William R. Hinds

[57] ABSTRACT

A dip tube, being a branch line from a gas pressure line, extends into a liquid in a vented bubble pot. The bubble pot comprises a precision bore vessel containing a displaceable body with an actuator, preferably a stepping motor, for moving the body arranged outside the pot. Displacement of the body changes the liquid level in the vessel to thereby regulate the pressure in the gas pressure line.

3 Claims, 2 Drawing Sheets

INTERFACE CONTROL APPARATUS

The present invention concerns a control apparatus for maintaining an interface between two immiscible liquids at a required level. In particular the invention concerns an interface controller for use with mixer settlers.

FEATURES AND ASPECTS OF THE INVENTION

According to the present invention there is provided an interface control apparatus including a gas pressure line for controlling an interface between two liquids, the apparatus comprising a bubble pot, a dip-tube extending into a liquid in the pot, a vent from the pot, a displaceable body within the pot and a selectively operable actuator for displacing the body positioned outside the pot whereby displacement of the body within the pot determines the level of liquid in the pot to thereby regulate the pressure in the gas line. The actuator preferably comprises a stepping motor by which the displacement of the body can be controlled accurately, resulting in fine control of the level of the liquid in the pot.

DESCRIPTION OF THE DRAWINGS

The invention will be described further, by way of example, with reference to the accompanying drawings, in which:

In FIG. 1, the controller comprises a bubble pot 1 having a dip-tube 2 in a branch 3 from a gas pressure line 4, generally compressed air, to a mixer-settler (not shown). Air bubbling through liquid 5 in the pot 1 is vented through line 6. The air purge through the pot 1 regulates the pressure in the line 4 to equal a hydrostatic head imposed by the liquid in the pot. Variation of the liquid level in the pot changes the hydrostatic head and as a consequence the pressure in the line 4. In FIG. 1 the liquid level in the pot 1 is varied by displacement of a bellows 7 which forms a part of the pot, the bellows 7 being displaceable by an actuator 8.

Figure 2:
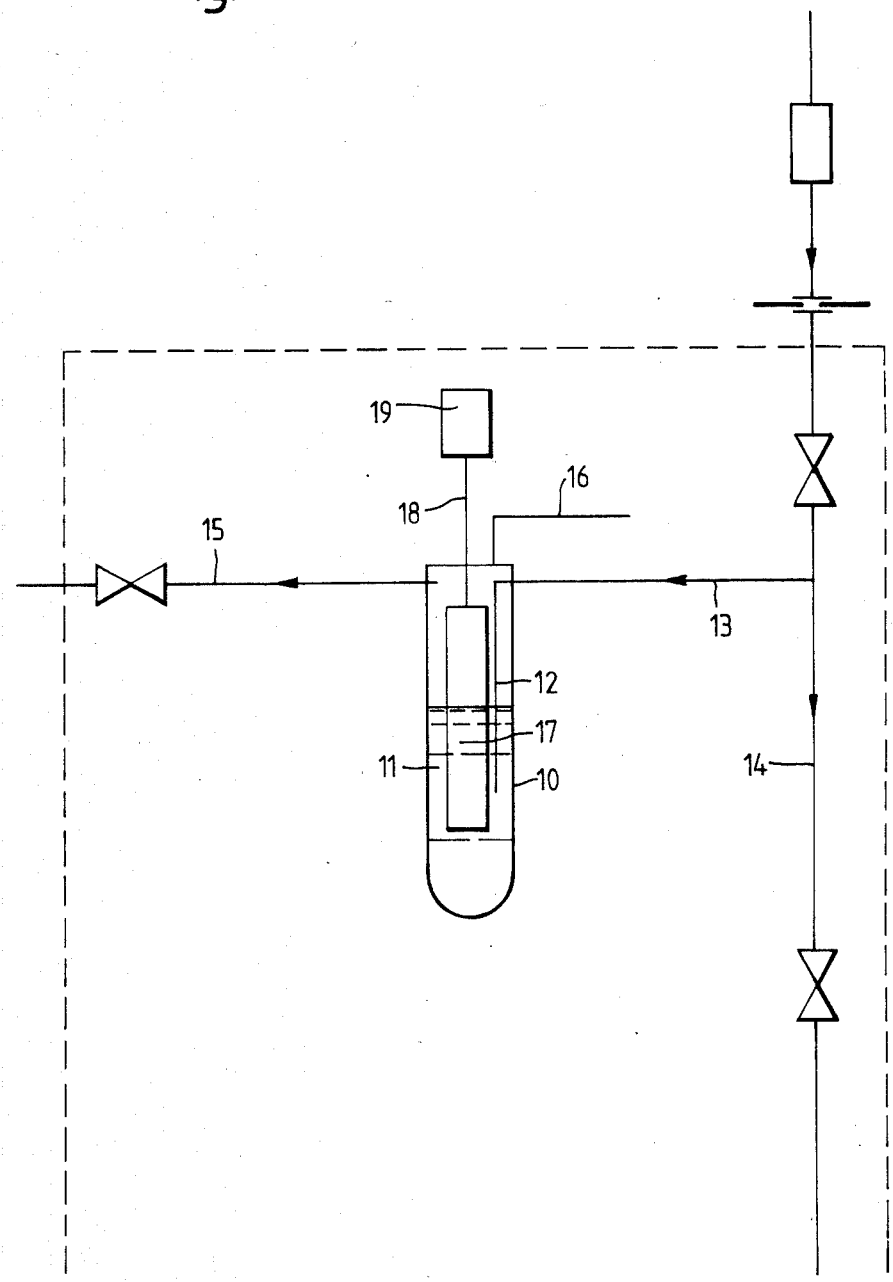
FIG. 2 illustrates a controller according to the invention.

To avoid the use of a bellows which can deteriorate and require periodic replacement reference is now made to the arrangement in FIG. 2.

DESCRIPTION OF THE PREFERRED EMBODIMENT

Figure 1:
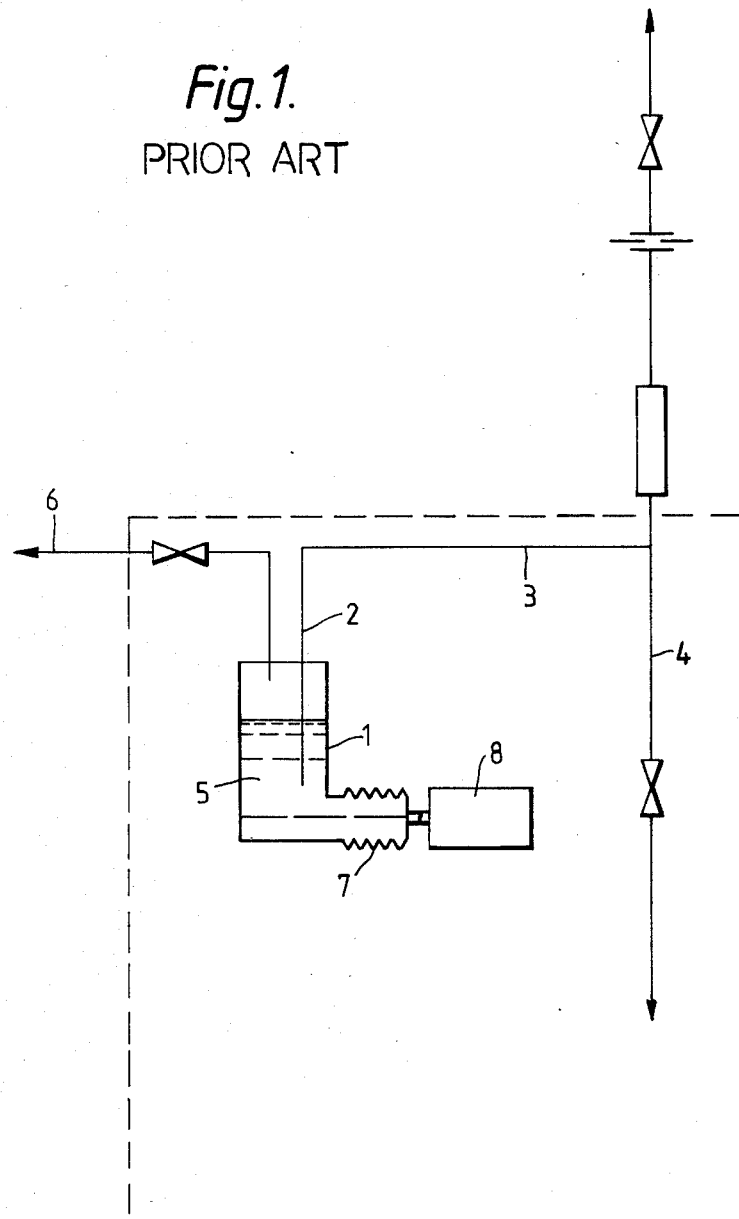
FIG. 1 is a schematic representation of a known interface controller.

In FIG. 2, a precision bore vessel 10 containing a liquid 11 is, as in the case of FIG. 1, provided with a dip-tube 12 connected through line 13 to a pressure line 14 leading to a mixer-settler. The vessel 10 is vented through line 15 and can be replenished with liquor 11 via a supply line 16. A displaceable body 17 is located within the vessel 10 and extends into the liquid 11. The body 17 is connected by a tie 18 to a stepping motor 19 located outside the vessel 10. Changes in level of the liquid 11 are obtained by actuating the motor 19 to lift or lower the body 17. As in the case of FIG. 1, the level of the liquid 11 in the vessel 10 determines the pressure in the line 14. The displacement of the body 17 can be controlled accurately by the stepping motor resulting in fine control of the level of the liquid 11.

I claim:

1. An interface control apparatus including a gas pressure line for controlling an interface between two liquids, the apparatus comprising a bubble pot, a dip tube from the gas pressure line extending into a liquid in the pot, a vent from the pot, a displaceable body within the pot and a selectively operable actuator for displacing the body arranged outside the pot whereby displacement of the body within the pot determines the level of the liquid in the pot and thereby regulates the pressure in the gas line, said actuator comprising a stepping motor connected by a tie to the body.

2. An apparatus according to claim 1 including a supply line for the liquid in the pot.

3. Gas pressure regulating apparatus for regulating pressure in a gas pressure line for controlling an interface between two liquids, comprising a gas pressure line for controlling an interface between two liquids, a bubble pot containing a liquid, a dip tube connected at one end with the gas pressure line and having an open end extending into the liquid in the bubble pot such that gas purge through the bubble pot depends on the hydrostatic head imposed by the liquid in the bubble pot, a vent from the bubble pot, a displaceable body within the bubble pot and extending into the liquid therein for variably establishing the level of the liquid in the pot depending on the extent of its immersion in the liquid and thereby regulating the gas pressure in the gas line, and a selectively operable actuator arranged outside the bubble pot for displacing the body to vary its immersion in the liquid so as to determine the liquid level in the pot and hence the hydrostatic head at the open end of the dip tube and thereby regulate the pressure in the gas line, said actuator comprising a stepping motor connected by a tie to the body.

* * * * *